United States Patent
Sekino et al.

(10) Patent No.: US 10,086,780 B2
(45) Date of Patent: Oct. 2, 2018

(54) POWER SUPPLY DEVICE

(71) Applicant: Yazaki Corporation, Tokyo (JP)

(72) Inventors: Tsukasa Sekino, Makinohara (JP);
Mitsunobu Kato, Makinohara (JP);
Masaki Yokoyama, Makinohara (JP);
Tatsuya Otuka, Makinohara (JP);
Tomoyasu Terada, Makinohara (JP);
Hiroshi Yamashita, Makinohara (JP)

(73) Assignee: YAZAKI CORPORATION,
Minato-ku, Tokyo (JP)

( * ) Notice: Subject to any disclaimer, the term of this patent is extended or adjusted under 35 U.S.C. 154(b) by 0 days.

(21) Appl. No.: 15/483,332

(22) Filed: Apr. 10, 2017

(65) Prior Publication Data

US 2017/0297515 A1    Oct. 19, 2017

(30) Foreign Application Priority Data

Apr. 15, 2016    (JP) ................................ 2016-082042

(51) Int. Cl.
*B60R 16/02* (2006.01)
*H02G 11/00* (2006.01)
*B60R 16/027* (2006.01)

(52) U.S. Cl.
CPC ........ *B60R 16/0215* (2013.01); *B60R 16/027* (2013.01); *H02G 11/006* (2013.01)

(58) Field of Classification Search
USPC ...................................................... 174/72 A
See application file for complete search history.

(56) References Cited

U.S. PATENT DOCUMENTS

| 4,283,239 A * | 8/1981 | Corke | B29C 61/10 |
| | | | 156/85 |
| 4,436,566 A * | 3/1984 | Tight, Jr. | B29C 61/10 |
| | | | 156/248 |
| 5,551,190 A * | 9/1996 | Yamagishi | E05F 15/646 |
| | | | 49/280 |

(Continued)

FOREIGN PATENT DOCUMENTS

JP    2009-011136 A    1/2009
JP    2009-027809 A    2/2009

(Continued)

OTHER PUBLICATIONS

Japanese Office Action; Application No. 2016-082042; dated Jul. 31, 2018.

*Primary Examiner* — William H Mayo, III
*Assistant Examiner* — Krystal Robinson
(74) *Attorney, Agent, or Firm* — Sughrue Mion, PLLC (57) ABSTRACT

Provided is a power supply device capable of suppressing bulge of a wire harness toward a vehicle body when a slide door is half-opened. The power supply device is provided with a wire harness arranged between a vehicle body and a slide door, a portion of the wire harness on the vehicle body side extending in the closing direction of the slide door when the slide door is half-opened, and a door side coil spring (a biasing part) for biasing a portion of the wire harness on the slide door side in the biasing direction pressing against the slide door on the closing direction side of the slide door in order to suppress a curvature convex toward the inside of the vehicle body at the time of half-opening of the slide door.

8 Claims, 7 Drawing Sheets

(56) References Cited

U.S. PATENT DOCUMENTS

| | | | |
|---|---|---|---|
| 5,967,194 A * | 10/1999 | Martin | B60R 16/0215 138/110 |
| 6,135,538 A * | 10/2000 | Serizawa | B60R 16/0207 174/64 |
| 6,774,312 B2 * | 8/2004 | Fatato | F16L 3/26 138/122 |
| 7,980,622 B2 * | 7/2011 | Noritsugu | B60R 16/0215 174/72 A |
| 9,738,240 B2 | 8/2017 | Kogure | |
| 2001/0052203 A1 * | 12/2001 | Doshita | B60R 16/0215 49/502 |
| 2005/0092512 A1 * | 5/2005 | Kogure | B60R 16/0207 174/72 A |
| 2006/0168891 A1 * | 8/2006 | Aoyama | E05F 15/632 49/360 |
| 2008/0128232 A1 * | 6/2008 | Aoki | B60J 5/06 191/22 R |
| 2009/0000682 A1 | 1/2009 | Kisu et al. | |
| 2009/0223132 A1 * | 9/2009 | Aoki | B60R 16/0215 49/360 |

FOREIGN PATENT DOCUMENTS

| | | |
|---|---|---|
| JP | 2009-027810 A | 2/2009 |
| JP | 2015128366 A | 7/2015 |

* cited by examiner

POWER SUPPLY DEVICE

BACKGROUND OF THE INVENTION

Field of the Invention

The present invention relates to a power supply device for electrically connecting a vehicle body and a slide door via a wire harness.

Description of the Related Art

Conventionally, a power supply in a vehicle having a slide door is known for electrically connecting a vehicle body and a slide door via a wire harness (see, for example, Patent Documents 1 to 3). In such power supply device, the wire harness is held so that the wire harness can move without difficulty following the slide door when the slide door opens and closes.

Here, as a configuration for holding the wire harness as described above in the power supply device, for example, there is a configuration to hold wire harness in a freely swingable manner about a swing shaft parallel to the slide door and orthogonal to an opening and closing direction of the slide door. In this configuration, when opening and closing the slide door, wire harness follows the slide door and swings around the above-mentioned swing shaft.

CITATION LIST

Patent Document

Patent Document 1: Japanese Unexamined Patent Publication No. 2009-011136
Patent Document 2: Japanese Unexamined Patent Publication No. 2009-027809
Patent Document 3: Japanese Unexamined Patent Publication No. 2009-027810

SUMMARY OF THE INVENTION

Technical Problem

In the power supply device having the swingable structure as described above, when the slide door opens or closed, that is, the wire harness is deformed when the slide door is half-opened, and a part of the wire harness bends in a form bulging toward the vehicle body side. On the other hand, since the vehicle body side becomes an indoor space on which an occupant rides, there is a demand for suppressing bulging toward the vehicle body side when the wire harness bends.

Therefore, the present invention, focusing on the above-mentioned requirement, aims at providing a power supply device capable of suppressing bulge of a harness toward the vehicle body side at the half-opening of the slide door.

Solution to Problem

In order to solve the above-mentioned problems, the power supply device of the present invention which electrically connects a vehicle body and a slide door a vehicle includes, includes: a wire harness wired between the vehicle body and the slide door, a portion thereof on the body side extending in a closing direction of the slide door when the slide door is half-opened; and a biasing part biasing a portion of the wire harness on the slide door side in a direction to press against the slide door at a side in the closing direction of the slide door in order to suppress the portion of the wire harness on the vehicle body side being curved convexly inside the vehicle body when the slide door is half-opened.

In the electric power supply device of the present invention, a part of the wire harness on the slide door side is pressed by the slide door on the closing direction side of the slide door by biasing of the biasing part when the slide door is half-opened. Thus the wire harness is pulled toward the slide door as a whole, and a curvature is suppressed in which a portion of the wire harness extending in the closing direction of the vehicle body becomes convex toward the inside of the vehicle body. That is, the bulge of the wire harness to the vehicle body side at the time of half-opening of the slide door is suppressed.

Further, it is preferred that in the power supply device of the present invention, when the slide door is half-opened, a middle portion of the wiring harness is pushed and curved convexly in the closing direction of the slide door by biasing at the biasing part on a plane intersecting the slide door and along an opening and closing direction of the slide door, and a portion extending from the vehicle body side to a curved portion is extended in the closing direction, forming generally a substantially U shape.

According to this preferable power supply device, compared with the case where the wire harness becomes such as S shape for example between the vehicle body and the slide door, the force is small to push a vehicle body side of the wire harness inside the vehicle body with reaction at the time of being curved. This allows the curvature of the wire harness on the vehicle body side to be further suppressed, thereby further suppressing the bulge of the wire harness toward the vehicle body side.

Further, in the power supply device of the present invention, it is preferable that the power supply device further includes: a door side holding part fixed to the slide door, holding in a freely swingable manner the portion of the wire harness on the slide door side about a door side swing shaft parallel to the slide door and orthogonal to the opening and closing direction; and a restricting part regulating a position of the wire harness around the door side swing shaft in the opening direction of the slide door so that the wire harness and the slide door form an acute angle of a predetermined angle or more about the swing shaft when the slide door is fully closed.

In this preferred power supply device, when the slide door is fully closed, the wire harness and the slide door form the acute angle of the predetermined angle or more on the opening direction side of the slide door around the door side swing shaft, the wire harness is inclined to some extent with respect to the slide door. Herewith, when the slide door opens, coupled with the biasing at the biasing part, the wire harness swings swiftly in a direction in which an inclined angle opens with respect to the slide door, and the portion of the wire harness on the door side is oriented in a direction of extending from the slide door toward the closing direction of the slide door. As a result, the middle of the wire harness is pushed out in the closing direction of the slide door, the wire harness extends along the opening and closing direction on the vehicle body side. In this way, according to the electric device above-mentioned, when the slide door opens, the wire harness extends on the vehicle body side promptly, thereby enabling the bulge of the wire harness toward the vehicle body side to be quickly inhibited.

Further, in the power supply device of the present invention, it is preferable to include a second biasing part for biasing the portion of the wire harness on the vehicle body side in a direction separating from the vehicle body on the closing direction side of the slide door.

In this preferred power supply device, when the slide door opens and closes, the portion of the wire harness on the vehicle body side is separated from the vehicle body by the biasing force of the second biasing part. Herewith, when the slide door is half-opened, the wire harness is gathered to the slide door side as a whole. In other words, with this preferred power supply device, the biasing force of the second biasing part allows the bulge of the wire harness side on the vehicle body when the slide door is half-opened to be further suppressed.

Advantages of the Invention

According to the present invention, a power supply device capable of suppressing the bulge of the wire harness toward the vehicle body side when the slide door is half-opened can be obtained.

DESCRIPTION OF EMBODIMENTS

Hereinafter, a power supply device according to an embodiment of the present invention will be described. First, a power supply device according to the first implementation of the present invention will be described.

Figure 1:
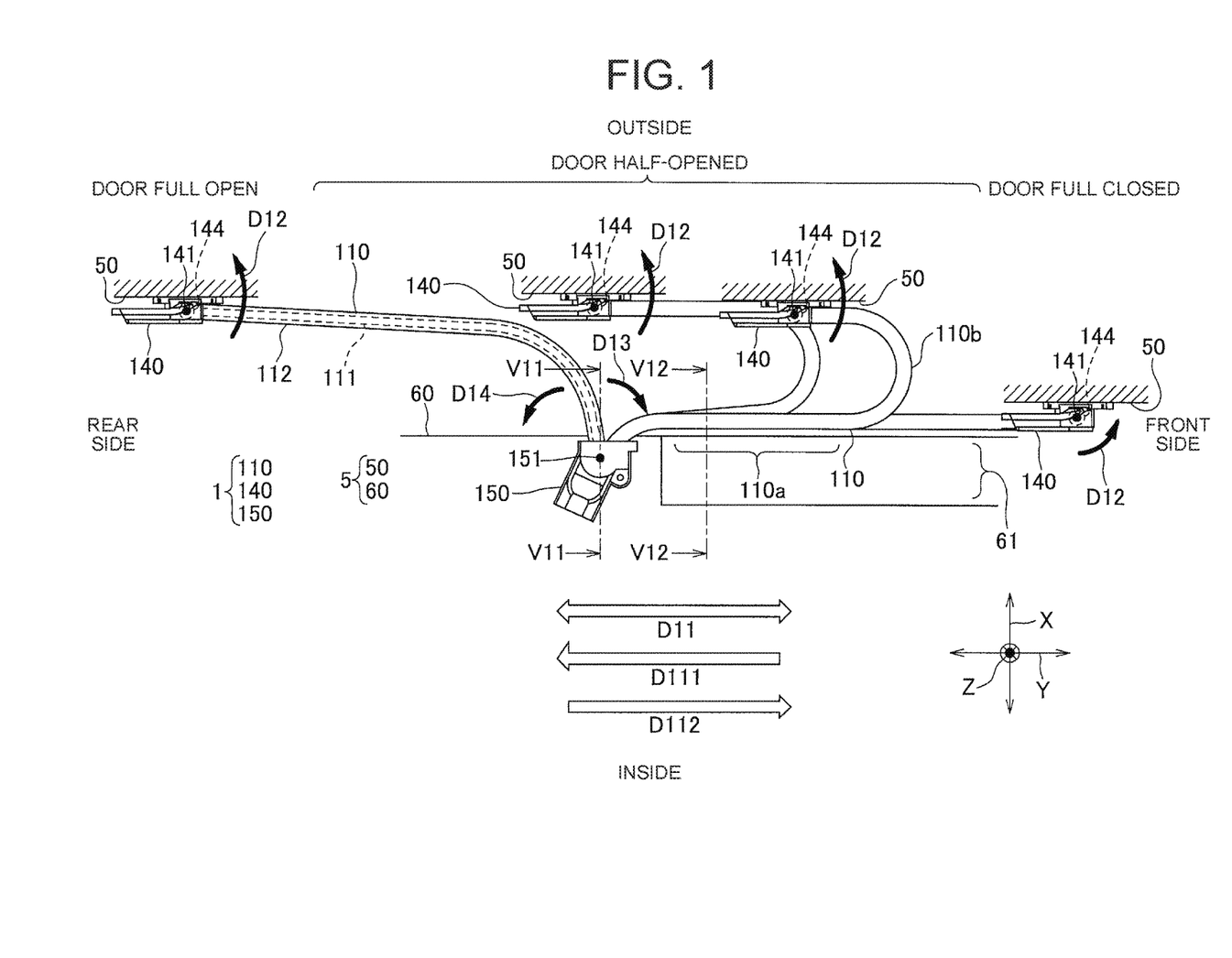
FIG. 1 is a diagram illustrating a power supply device according to a first embodiment of the present invention.

FIG. 1 is a diagram illustrating the power supply device according to the first embodiment of the present invention. The power supply device 1 of this embodiment is one that in a vehicle 5 having a vehicle body 60 and a slide door 50, electrically connects the vehicle body 60 and the slide door 50 via a wire harness 110 wired therebetween. Note that the right side in the figure of FIG. 1 corresponds to the front side of the vehicle 5, the left side in the figure the rear side of the vehicle 5, the upper side in the figure the outside of the vehicle 5, and the lower side in the figure the inside of the vehicle 5. Also, the vertical direction in the figure is the X direction in the present embodiment, and the horizontal direction in the figure the Y direction in the present embodiment, and the direction perpendicular to the paper surface the Z direction.

In the power supply device 1, electric power is supplied from a not-shown power source provided in the vehicle body 60 to a not-shown electric device provided in the slide door 50 via the wire harness 110. Furthermore, in the electric device 1, electric signals are also exchanged between a not-shown control means provided in the vehicle body 60 and provided in the not-shown electric devices provided in the slide door 50 via the wire harness 110. The electric device 1 includes the wire harness 110, a door side holding part 140, and a vehicle body side holding part 150. The wire harness 110 is one in which a portion in a wire bundle 111 in which a plurality of electric wires is bundled is passed through the resin made corrugated tube 112. In the wire bundle 111 a portion between the vehicle body 60 and the slide door 50 is passed through the corrugated tube 112.

An end portion of the corrugated tube 112 on the slide door 50 side is held swingably to the door side holding part 140 on the XY plane, with the Z direction of the vertical direction of the vehicle 5 as a swing axis direction. This XY plane intersects with the slide door 50 and also is a plane along the opening and closing direction D11 of the slide door 50 (the Y direction which is the longitudinal direction of the vehicle 5). The door side holding part 140 is fixed to the slide door 50. A door side swing shaft 141 provided in the door side holding part 140 in the Z direction is parallel to the slide door 50 and orthogonal to the opening and closing direction D 11 of the slide door 50. An end portion on the slide door 5 side in the corrugated tube 112 is held swingably about the door side swing shaft 141 by the door side holding part 140. Holding of the corrugated tube 112 by the door side holding part 140 allows the wire harness 110 to be held on the XY plane, with the portion of the slide door 50 being swingable about the side of the door side swing shaft 141. A side of the wire bundle 111 constituting the wire harness 110 on the slide door 50 side exits from an end portion of the corrugated tube 112 on the slide door 50 side. Further, after passing through a not-shown passage inside the door side holding part 140 and exiting from this door side holding part 140, the wire bundle 111 extends to an electric device of the slide door 50.

On the other hand, an end portion of the corrugated tube 112 on the vehicle body 60 side is held swingably to a vehicle body side holding part 150 on the XY plane, with the Z direction of the vertical direction of the vehicle 5 as the swing axis direction. The vehicle body side holding part 150 is fixed to the vehicle body 60. A vehicle body side swing shaft 151 provided on the vehicle body side holding part 150 in the Z direction is parallel to the slide door 50 and orthogonal to the opening and closing direction D11 of the slide door 50. An end portion of the corrugated tube 112 on the body 6 side is held swingably about a vehicle body side swing shaft 151 by the vehicle body side holding part 150. Holding of the corrugated tube 112 by the vehicle body side holding part 150 allows the wire harness 110 to be held on the XY plane with the portion on the vehicle body 60 side swingable around the vehicle body side swing shaft 151. A side of the wire bundle 111 on the slide door 50 side exits from an end portion of the corrugated tube 112 on the vehicle body 60 side, and after passing through a not-shown passage inside the door side holding part 150 and exiting from this door side holding part 150, extends to a not-shown power supply or a control means in the vehicle body 60.

When opening and closing the slide door 50, both end portions of the corrugated tube 112 swings about the respective swing shafts 141 and 151 following the movement of the slide door 5. As a result, the tube 112, that is, the wire harness 110 through which the wire bundle 111 is passed, moves while being deformed following the movement of the slide door 50.

Here, the end portion of the floor of the vehicle body 60 on the slide door 50 side is lowered one level and becomes a step 61 for the rider to put on his feet when boarding. When opening and closing the slide door 50, a side of the corrugated tube 112 (wire harness 110) which moves together with the slide door 50 on the vehicle body 60 side passes near the step 61 on the XY plane.

In this case, generally, in the field of the power supply device attached to the slide door of the vehicle, there is a desire to suppress a bulge toward the vehicle body side when the wire harness curves at the time of half-opening which is in the process of opening and closing of the slide door. Therefore, in order to suppress such curvature as to bulge the wire harness 110 toward the vehicle body 60, the wire harness 110 in the present embodiment is devised as described below.

That is, when the slide door 50 is half-opened, the wire harness 110, as shown in FIG. 1, becomes formed in a shape having a vehicle body side linear portion 110a extending substantially linearly along the opening and closing direction D 11 of the slide door 50 on the side of the vehicle body 60. In addition, the wire harness 110 curves on the XY plane with its midsection 110b being bulged convexly to the direction D 112. Thereby, in the wire harness 110 a portion extending from the vehicle body 60 side to the curved portion extends in the closing direction D112, and becomes a substantially U shape in which the linear portion 110a on the vehicle body side is formed.

In the present embodiment, forming of the wire harness 110 into a substantially U-shaped when the slide door 50 is half-opened is performed by such spring biasing as follows.

First, the end portion of the corrugated tube 112 constituting the wire harness 110 on the slide door 50 side, in the door side holding part 140 holding the same, is biased in a biasing direction D12 that is a counterclockwise direction in FIG. 1 around the door side swing shaft 141. In the present embodiment such biasing is applied by a door side coil spring 144 as a biasing part provided around the door side swing shaft 141. The door side coil spring 144 directs the end portion of the corrugated tube 112 in a direction extending from the slide door 50 toward the closing direction D112 of the slide door 50, and also bias it, such as to push it, against the slide door 50 on the closing direction D112 side of the slide door 50. Biasing against the end portion of the corrugated tube 112 allows the portion of the wire harness 110 on the slide door 50 side to be biased in a direction to be pressed against the slide door 50 on the closing direction D 112 side of the slide door 50.

Figure 2:
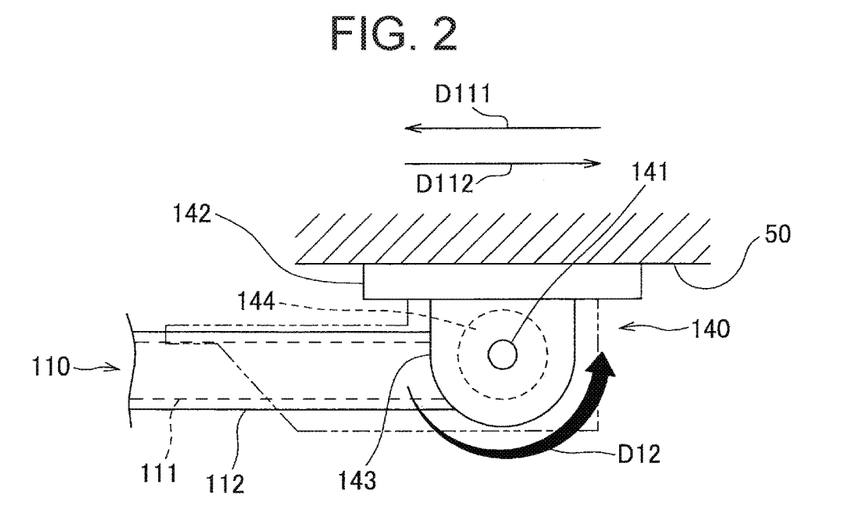
FIG. 2 is a perspective view of an end portion of a corrugated tube on a slide door side in the door side holding part shown in FIG. 1.

FIG. 2 is the schematic view illustrating a biasing structure with respect to the end portion of the corrugated tube on the slide door side in the door side holding part shown in FIG. 1.

As shown in FIG. 2, the door side holding part 140 is provided with a fixed portion 142 fixed to the slide door 50, and a swing portion 143 swingably supported about the door side swing shaft 141 also shown in FIG. 1. The end portion of the corrugated tube 112 on the slide door 50 side is fixed to the swing portion 143. The portion of the wire harness 110 on the slide door 50 side is held to the swing portion 143 by fixing the end portion of the corrugated tube 112. Around the door side swing shaft 141, a door side coil spring 144 is provided. The door side coil spring 144 causes the swing portion 143, that is, the end portion of the corrugated tube 112 on the slide door 50 side is biased in the biasing direction D12.

Further, the end portion of the corrugated tube 112 constituting the wire harness 110 on the vehicle body 60 side, in the vehicle body side holding part 150 that holds the same, is biased in a biasing direction D13 that is a direction of the counterclockwise rotation around a vehicle body side swing shaft 151 in FIG. 1.

Figure 3:
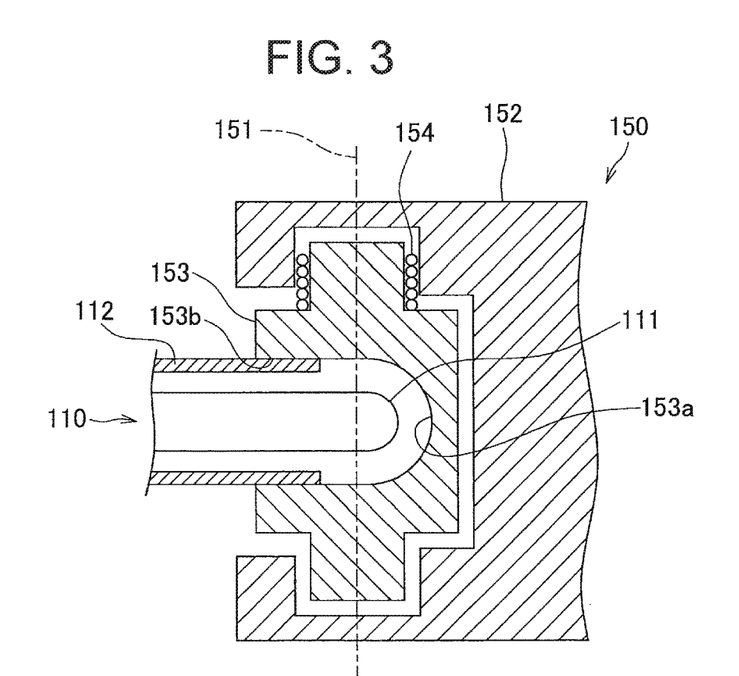
FIG. 3 is a schematic cross-sectional view of a cross section taken along line V11-V11 in FIG. 1 of a biasing structure with respect to an end portion of the vehicle body side of the corrugated tube in the holding part on the vehicle body side shown in FIG. 1.

FIG. 3 is the schematic cross-sectional view of a cross section taken along line V11-V11 shown in FIG. 1 of a biasing structure with respect to the end portion of the vehicle body side of the corrugated tube in the holding part on the vehicle body side shown in FIG. 1.

The vehicle body side holding part 150 includes a fixing portion 152 fixed to the vehicle body 60, a swing portion 153 supported swingably about the vehicle body side swing shaft 151 also shown in FIG. 1. Inside the swing portion 153, an insertion hole 153a is provided passing through a wire bundle 111 constituting the wire harness 110, which communicates with the slide door 50 side. The end portion of the corrugated tube 112 on the vehicle body 60 side is fixed to the opening 153b of the swing portion 153. The side of the wire harness 110 on the vehicle body 60 side is held to the swing portion 153 by fixing the end portion of the corrugated tube 112. A vehicle body side coil spring 154 is provided around the vehicle body side swing shaft 151. The body side coil spring 154 causes the swing portion 153, that is, the end portion of the corrugated tube 112 on the vehicle body 60 side is biased in the abovementioned biasing direction D13. In other words, the portion in the wire harness 110 on the vehicle body 60 side is biased in the biasing direction D13.

Biasing by spring against both end portions of the corrugated tube 112 by the door side holding part 140 and the vehicle body side holding part 150 causes the corrugated tube 112, that is, the wire harness 110 to deform as follows following the movement of the slide door 50 when the slide door 50 opens and closes.

When the slide door 50 is fully closed, as shown in FIG. 1, the door side holding part 140 is located on the front side of the vehicle 5 with respect to the slide door 50. Then, the wire harness 110 extends substantially straightly between the vehicle body side holding part 150 and the door side holding part 140 resisting biasing in the biasing direction D12. This is because, in this embodiment, the corrugated tube 112 is formed to have a length extending substantially straightly in this way when the slide door 50 is fully closed.

At the initial stage when the slide door 50 opens in an opening direction D111 toward the rear of the vehicle 5, the portion of the wire harness 110 on the slide door 50 side swings as follows. That is, this portion swings on the XY plane by the spring biasing by the door side coil spring 14 of the door side holding part 140 such as to be separated from the slide door 50 toward an opposite direction to the opening direction D111, that is, the front side of the vehicle 5 in the closing direction D112. After swinging, the door side coil spring 144 biases, such as to press, this portion of the wire harness 110 against the slide door 50 on the closing direction D112 side about the door side swing shaft 141.

Due to the above-described swinging at the initial stage of opening of the slide door 50 and subsequent biasing, during the movement of the slide door 50 in the opening direction D 111, that is, when the slide door 50 is half-opened, the wire harness 110 is curved as follows. That is, in the wire harness 110, as shown in FIG. 1, its midsection 110b is bulged convexly in the closing direction D 112 on the XY plane so as to be curved. As a result of this curvature, the portion of the wire harness 110 on the vehicle body 60 side is expanded substantially straightly in the closing direction D112 along the opening and closing direction D11 of the slide door 50, the linear portion 110a is formed, and the wire harness 110 becomes a substantially U shape as a whole. Also, at this time, the door side coil spring 144 presses the portion of the wire harness 110 on the slide door 50 side against the slide door 50 at the slide door 50 in the closing direction D112. Thereby, when the slide door 50 is half-opened, the curvature that the body side linear portion 110a of the wire harness 110 on the vehicle body 60 side extending in the direction D112 projects toward the inside of the closing direction on the vehicle body 60 side is suppressed.

In this way, the biasing of the door side coil spring 144 of the door side holding part 140 extends the wire harness 110 substantially linearly along the opening and closing direction D 11 of the slide door 50 on the vehicle body 60 side, suppressing the bulging of the vehicle body side linear portion 110a inside the vehicle. Also, as stated above the body side linear portion 110a is biased by the vehicle body side coil spring 154 of the vehicle body side holding part 150 in the biasing direction D 13 when the slide door 50 is half-opened so as not to be separated from the vehicle body 60, and the linearity is thereby further maintained and the above-mentioned U shape is set. Compared with a case where the wire harness 110 is curved in an S shape on the XY plane and the like, such U-shaped curvature reduces a load placed to the wire bundle 111 forming the wire harness 110 and the corrugated tube 112.

As the slide door 50 moves in the opening direction D111, an arm of the wire harness 110 on the slide door 50 side in the shape of U extends and an arm on the vehicle body 60 side shortens. And, when the arm on the body 60 side becomes shorter to some extent, a portion of the wire harness 110 on the vehicle body 60 side swings to the rear side of the vehicle 5 in a direction D 14 opposite to the biasing direction D 13 against the biasing force of the vehicle body side holding part 150. Thereafter, the slide door 50 moves with this state in the opening direction D111 and reaches the fully opened state.

When the slide door 50 is closed from the fully open state in the closing direction D112, the operation of the wire harness 110 is reversed from such a state as it operates when the slide door 50 opens. First, swinging of the portion of the wire harness 110 on the vehicle body 60 side in the biasing direction D13 makes the wire harness 110 U shape on the XY plane. Thereafter, the slide door 50 continues to move in the closing direction D112 and the arm on the slide door 50 side in the U shape shortens to some extent, the portion of the wire harness 110 on the slide door 50 side swings as follows. That is, at this stage, the portion of the wire harness 110 on the slide door 50 swings against the biasing force of the holding part 140 to the rear side of the vehicle 5 opposite to the biasing direction D12. Thereafter, the slide door 50 moves in this state in the closing direction D112 and the wire harness 110 reaches the fully closed state while extending linearly.

As described above, in the power supply device 1 according to the present embodiment, the wire harness 110 is formed having the vehicle side linear portion 110a extending in a substantially straight line along the opening and closing direction D11 of the slide door 50 on the vehicle body 60 when the idle door 50 is half-opened. The curvature in which the vehicle body side linear portion 110a becomes convex toward the vehicle body 60 side is suppressed. Thus, when the slide door 50 opens and closes, the wire harness 110 is arranged at the following preferable positions in the vicinity of the vehicle body 60.

Figure 4:
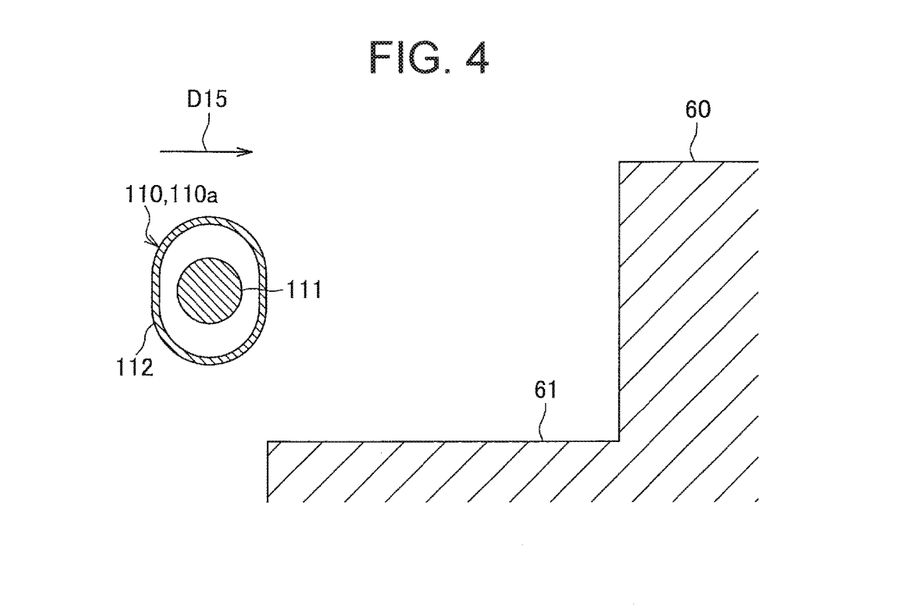
FIG. 4 is a cross-sectional view of a cross section taken along line V12-V12 in FIG. 1 illustrating a state in which the wire harness is arranged in a preferred position in the vicinity of the vehicle body when the slide door opens and closes.

FIG. 4 is a view illustrating a state in which the wire harness is positioned in the vicinity of the vehicle body at a preferable position in a cross section taken along the line V 12-V 12 in FIG. 1.

As described above, when opening and closing the slide door 50, the corrugated tube 112, that is, the wire harness 110 having the wire bundle 111 passed therethrough has a substantially U shape, and the vehicle body side linear portion 110a is formed in a substantially linear state on the body 60 side. This vehicle body side linear portion 110a is prevented from bulging toward the inside of the vehicle body 60 in the direction of the arrow D15 and, as shown in FIG. 4, is located somewhat outside a step 61 of the vehicle body 60. As described above, the bulge of the wire harness 110 toward the body 60 side when the slide door 50 is half-opened becomes suppressed.

Further, in the present embodiment, as described above, the middle portion of the wire harness 110 is pushed out in the closing direction D112 so as to be curved when the slide door is half-opened, thereby forming a substantially U shape. As a result, compared with the case where the wire harness 110 takes a shape such as an S shape and so on between the vehicle body 60 and the slide door 50, there is a reaction force at the time of bending, and the force to press the wire harness 110 on the vehicle body 60 side further toward the vehicle body 60 side is small. As a result, the bulge of the wire harness 110 toward the vehicle body 60 becomes further suppressed.

In this embodiment, at the initial stage of opening of the slide door 50, the door side coil spring 144 of the door side holding part 140 illustrated in FIG. 2 is illustrated as an example of a structure leading the wire harness 110 to a substantially U-shaped curvature having the vehicle body side linear portion 110a. However the following alternative structure is also conceivable as a structure that leads the wire harness 110 to a curved shape at the initial stage of opening of the slide door 50.

Figure 5:
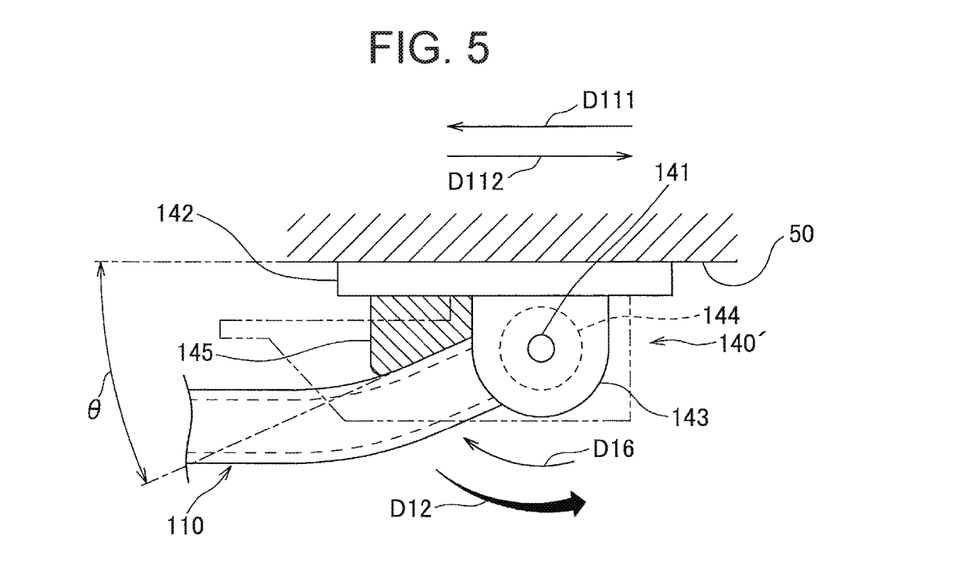
FIG. 5 shows another example of a structure for guiding the wire harness to a curved shape when a slide door opens.

FIG. 5 shows another example of the structure for guiding the wire harness to the curved shape when the slide door opens. Note that in FIG. 5 the same constituent elements as the door-side holding part 140 of the present embodiment shown in FIG. 2 are given the same reference numerals in FIG. 2.

In addition to the above-described door side coil spring 144 for biasing, a restricting part 145 for regulating position of the wire harness 110 around the door side swing shaft 141 is provided in the door side holding part 140' of another example shown in FIG. 5. The restricting part 145 regulates a position on the front side of the opening direction D111 of the slide door 50 around the door side swing shaft 141 when the slide door 50 is fully closed as follows. That is, the restricting part 145 regulates this position such that the wire harness 110 and the slide door 50 form an acute angle θ of a predetermined angle or more around the door side swing shaft 141. This position regulation is performed such that swinging of the harness 110 in the swinging direction D 16 when the slide door 50 is closed in the closing direction D112 stops at the position where the wire harness 110 and the slide door 50 form the above-mentioned acute angle θ by the restricting part 145.

In the door side holding part 140' of this alternative example, when the slide door 50 is fully closed, the wire harness 110 and the slide door 50 form an acute angle θ of a predetermined angle or more on the side of the opening direction D 111 of the slide door 50 around the door side swing shaft 141. That is, when the slide door 50 is fully closed, the wire harness 110 is inclined to some extent with respect to the slide door 50. Thereby, the wire harness 110, when the slide door 50 opens, in conjunction with the biasing force in the biasing direction D12, promptly swings in a direction in which the inclination angle with respect to the slide door 50 increases. The end portion of the wire harness 110 on the slide door 50 side directs toward the closing direction D112 of the slide door 50 in a direction extending from the slide door 50. As a result, the midsection 110b of the wire harness 110 is pushed out convexly in the closing direction D112 of the slide door 50, and the wire harness 110 extends in a substantially linear shape along the opening/closing direction D11 on the vehicle body 60 side. As described above, according to a door side holding part 140' of another example, the wire harness 110 promptly extends in a substantially straight line when the slide door 50 opens. Therefore, bulge of the wire harness 110 toward the vehicle body 60 side when the idle door 50 opens is promptly suppressed.

Next, a power supply device according to a second embodiment of the present invention will be described with reference to FIGS. 6 to 9. In the two embodiments, the door-side holding part and the vehicle-body side holding part schematically described in the first embodiment will be explained in detail. In the second embodiment, the biasing direction and the like in the vehicle body side holding part is opposite to that of the first embodiment, and as a result, a deformation form in the wire harness at the time of half-opening is somewhat different from that of the first embodiment. Hereinafter, although partly overlapping with the explanation about the first embodiment for the second embodiment, the differences from the first embodiment are mainly focused and will be explained.

Figure 6:
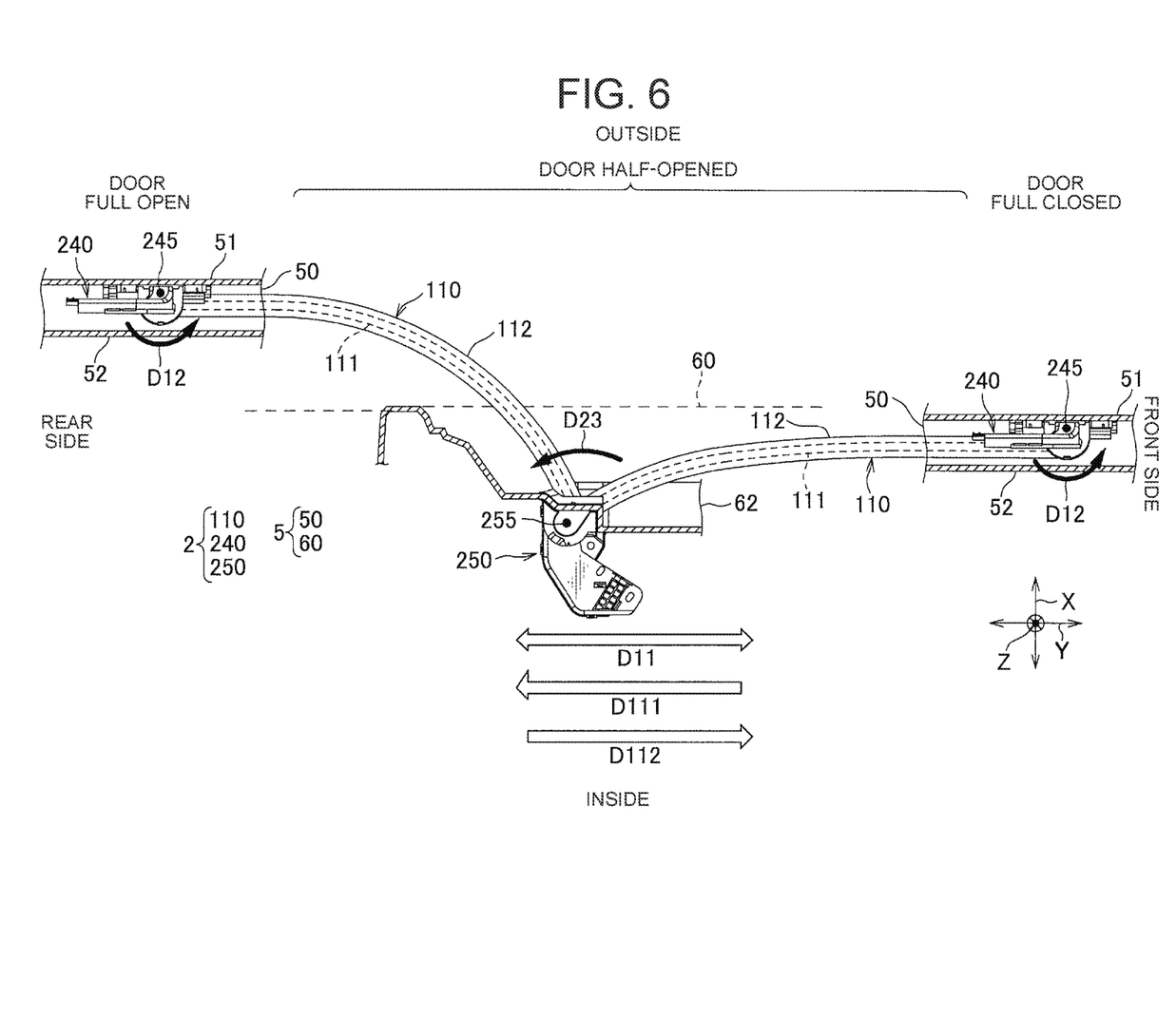
FIG. 6 is a diagram illustrating a power supply device according to a second embodiment of the present invention.

FIG. 6 is a diagram illustrating a power supply device according to a second embodiment of the present invention. In FIG. 6, the same components as those in FIG. 1 such as the vehicle, the wiring harness or the like, and the same directions as each of those in FIG. 1 are given the same reference numerals as in FIG. 1. Also the power supply device 2 of the present embodiment is also the one that electrically connects the vehicle body 60 and the slide door 50 via a wire harness 110. In FIG. 6 the right side in the figure corresponds to the front side of the vehicle 5, the left side in the figure the rear side of the vehicle 5, the upper side in the figure the outside of the vehicle, and the lower side in the figure the inside of the vehicle. Also, the vertical direction in the figure corresponds to the X direction in the present embodiment, the horizontal direction in the figure the Y direction in the present embodiment, and the direction perpendicular to the paper surface the Z direction.

The power supply device 2 is provided with power on the slide door 50 from a not-shown power source provided in the vehicle body 60 to a not-shown electric device via the wire harness 110. Also, in the electric device 2, electric signals are exchanged between not-shown control means provided in the vehicle body 60 and the not-shown electric device provided in the slide door 50 via the wire harness 110. The electric device 2 includes the wire harness 110, a door side holding part 240, and a vehicle body side holding part 250.

A part of the wire harness 110 in the wire bundle 111 in which a plurality of electric wires are bundled is passed through a corrugated tube 112 having a property of flexibility. A portion of the wire bundle 111 between the vehicle body 60 and the slide door 50 is passed through the corrugated tube 112.

One end portion of the corrugated tube 112 is held swingably to a door side holding part 240 around a vehicle door side holding shaft 245 extending in the Z direction that is the vertical direction of the vehicle, the other end portion is held swingably to a vehicle body side holding part 250 around a vehicle body side swing shaft 255 extending in the Z direction. The door side holding part 240 is fixed to a door panel 51 such as to be located between the door panel 51 and a door trim 52 constituting the slide door 50. In addition, a part of the vehicle body side holding part 250 is fixed to the vehicle body 60 so as to be integrated with a scuff trim 62 which is a part of the interior panel of the vehicle body 60.

The slide door 50 opens and closes in the opening and closing direction D11 along the Y direction which is the front-rear direction of the vehicle. In the door side holding part 240, one end of the corrugated tube 11 constituting the wire harness 110 on the slide door 50 side is biased in the biasing direction D12 corresponding to the counterclockwise direction in FIG. 6 about the door side swing shaft 245. The biasing direction D12 corresponds to a direction in which the wire harness 110 swings in a swinging direction opposite to the opening direction D 111 of the slide door 50 on the door side.

In the vehicle body side holding part 250, one end of the corrugated tube 112 constituting the wire harness 110 on the vehicle body 60 side is biased in a biasing direction D23 that is the counterclockwise direction in FIG. 6 around the vehicle body side swing shaft 255. The biasing direction D23 is a direction in which the wire harness 110 swings in the same direction as the opening direction D 111 of the slide door 50 on the vehicle body side.

Figure 7:
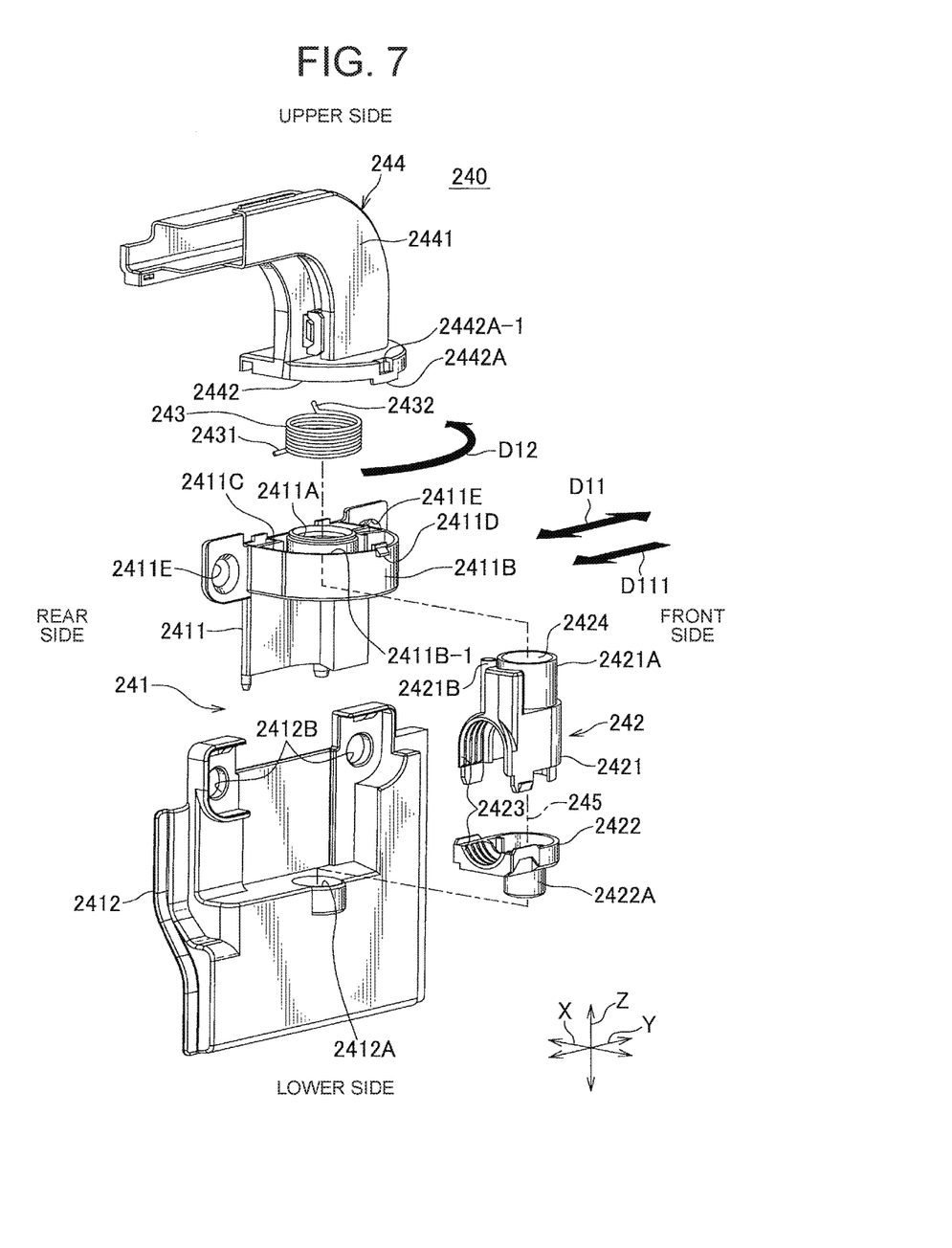
FIG. 7 is an exploded perspective view illustrating the door side holding part shown in FIG. 6.

FIG. 7 is an exploded perspective view illustrating the door side holding part shown in FIG. 6. In this FIG. 7, the X direction, the Y direction, and the Z direction in FIG. 6 are shown. Further, in FIG. 7, similarly to FIG. 6, the right side corresponds to the front side of the vehicle 5, and the left side in the figure the rear side of the vehicle 5. Further, the upper side corresponds to the upper side of the vehicle 5, and the lower side in the figure the lower side of the vehicle 5.

The door side holding part 240 includes a door side support member 241, a door side swing member 242, a door side coil spring 243, and a guide member 244. The door side support member 241 is fixed to the door panel 51 of the slide door 50. The door side swing member 242 holds a part of the wire harness 110 through which the electric wire bundle 111 passes on the slide door 50 side by holding one end portion in the corrugated tube 112 on the slide door 50 side. And the door side swing member 242 is pivotally supported on the door side support member 241 around the door side swing shaft 245 having the Z direction as an axial direction parallel to the slide door 50 orthogonal to D 11 (Y direction) in the opening and closing direction of the slide door 50, swingably in the opening and closing direction D 11 (Y direction) of the door 50. The door side coil spring 243 is wound around the door side swing shaft 245 so as to bias the door side swing member 242 around the door side swing shaft 245 in the biasing direction D12 opposite to the opening direction D111 of the of the slide door 50 also shown in FIG. 6. The guide member 244 is incorporated into the door side support member 241. The guide member 244 guides the wire bundle 111 leaving the corrugated tube 112 and passing through the inside of the door side swing member 242 toward the rear side in the Y direction.

The door side swing member 242 includes a first swing member 2421 and a second swing member 2422. The first swing member 2421 includes a hollow first shaft 2421A protruding upward in the Z direction, and a first locking portion 2421B to which one end portion 2431 of the coil spring 243 is locked. The second swing member 2422 is provided with a second shaft portion 2422A projecting downward in the Z direction. The first swing member 2421 and the second swing member 2422, when assembled to each other, open in a direction orthogonal to the Z direction, and a door side tube fixing port 2423 is formed to which the end portion of the corrugated tubes 112 on the slide door 50 side is fixed. Then, at the door side swing member 242, a door side insertion path 2424 of the electric wire bundle 111 is formed that reaches the inside of the hollow first shaft 2421A from the door side tube fixing port 2423. The wire bundle 111 leaving the end portion of the corrugated tubes 112 passes through the door side insertion path 2424 toward the guide member 244.

The door side support member 241 includes a first support member 2411 and a second support member 2412. A first support member 2411, passing a first shaft 2421A therethrough, is provided with the first shaft 2421A that pivotally supports a first bearing portion 2411A. Then, a spring accommodating portion 2411B for accommodating the door side coil spring 243 is formed so as to surround the first bearing portion 2411A. The spring accommodating portion 2411B includes an opening 2411B which opens upward in the vehicle 5. In the spring accommodating portion 2411 B, a second locking portion 2411C to which another end portion 2432 of the door side coil spring 243 is locked. Further, on an outer wall surface of the spring accommodating portion 2411B, an engaging projection 2411D for attaching the guide member 244 is provided.

The second support member 2412 of the door side support member 241 has a second shaft portion 2422A inserted therein, and a second bearing portion 2412A that pivotally supports the second shaft portion 2422A is provided. Furthermore, the aforementioned first support member 2411 and second support member 2412 are provided with a plurality of through holes 2411E and 2412B, respectively to communicate when both are overlapped with each other.

In a state that the first shaft 2421A is pivotally supported by the first bearing portion 2411A, the second shaft portion 2422A by the second bearing 2412A, the first support member 2411 and the second support member 2412 are superimposed. Then, the first support member 2411 and the second support member 2412, with their being fastened together, are fixed to the door panel 51 of the door 50 with not-shown screws penetrating through holes 2411E and 2412B.

The guide member 244 is provided with an L-shaped guide path 2441 and a lid portion 2442. The L-shaped guideway 2441 is an L-shaped guideway that guides the wire bundle 111 passing through a door side insertion passage 2424 in the Z direction and the Y direction. The lid portion 2442 covers an opening 2411B-1 of the spring accommodating portion 2411B in the first support member 2411. The lid portion 2442 is provided with an engaging portion 2442A to which the engaging protrusion 2411D of the first support member 2411 is engaged. The engaging portion 2442A is provided with a hole 2442A-1, and the engaging projection 2411D enters into and engages with the hole 2442A-1.

Figure 8:
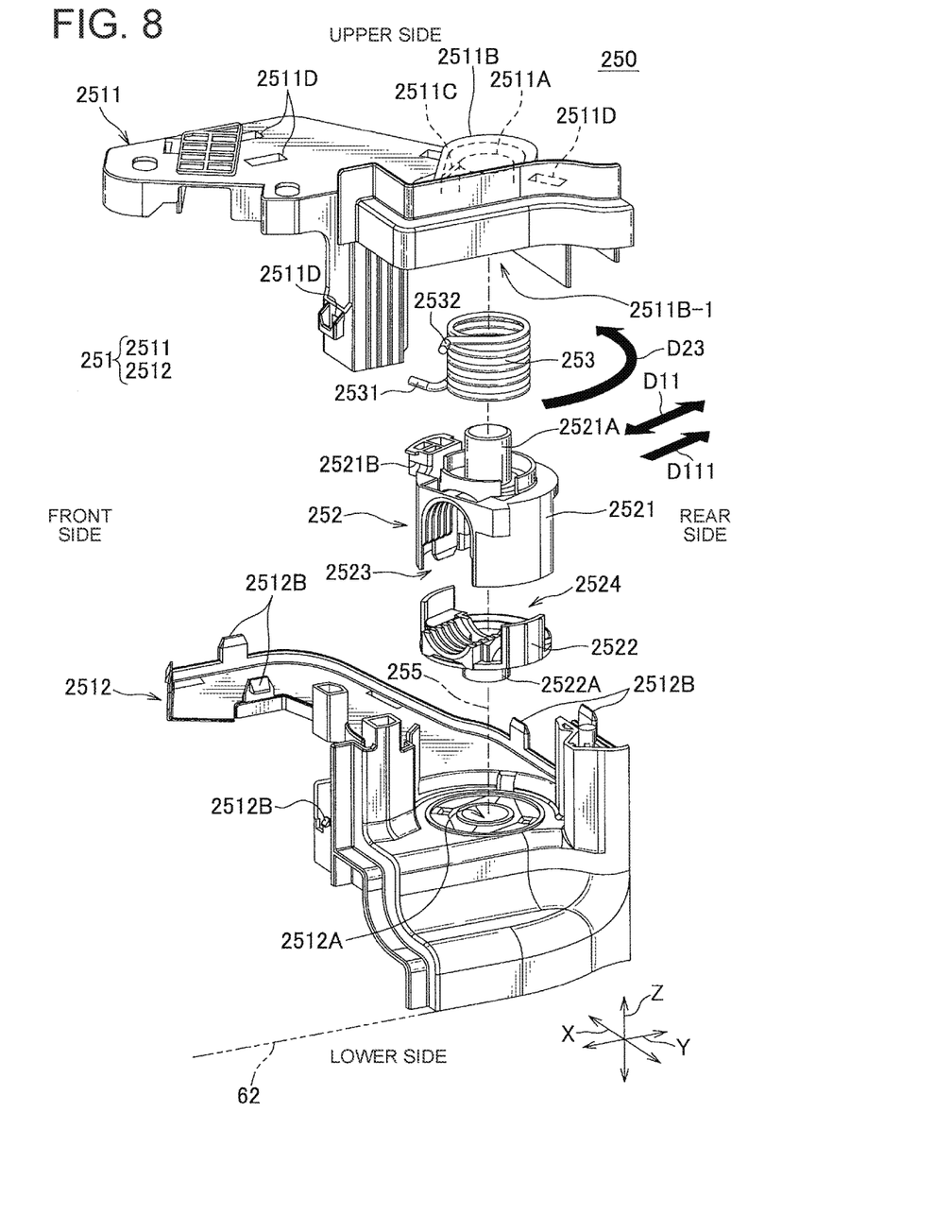
FIG. 8 is an exploded perspective view illustrating a vehicle body side unit shown in FIG. 6.

FIG. 8 is an exploded perspective view illustrating the vehicle body side unit shown in FIG. 6. Also in FIG. 8, the X direction, the Y direction, and the Z direction in FIG. 6 are shown. In addition, in FIG. 8, contrary to FIG. 6 and FIG. 7, the right side in the figure corresponds to the rear side of the vehicle 5, and the left side in the figure the front side of the vehicle 5. Furthermore, the upper side corresponds to the upper side of the vehicle 5, and the lower side in the figure the lower side of the vehicle 5.

The vehicle body side holding part 250 includes a vehicle body side support member 251, a vehicle body side swing member 252, a vehicle body side coil spring 253. The vehicle body side support member 251 is attached to a not-shown frame of the vehicle body 60. The vehicle body side swing member 252 holds one end portion of the corrugated tube 112 on the vehicle body 60 side, thereby holding one end of the wire harness 110 having the wire bundle 111 inserted therein on the vehicle body 60 side. Then, the vehicle body is pivotally supported on the vehicle body side support member 251 swingably in the axial direction (Y direction) of the slide door 50 about the vehicle body side swing shaft 255 parallel to the slide door 50 and having an axial direction as the Z direction orthogonal to the opening and closing direction D11 (Y direction) of the slide door 50. The vehicle body side coil spring 253 is wound around the vehicle body side swing shaft 255, thereby biasing the vehicle body side swing member 252 around the vehicle body side swing shaft 255 in the swing direction D23 same as the opening direction D111 of the slide door 50 oppositely shown in FIG. 6.

The vehicle body side swing member 252 includes a first swing member 2521 and a second swing member 2522. The first swing member 2521 includes a first shaft portion 2521A protruding upward in the Z direction, a first shaft portion 2521B to which one end portion 2531 of the leaf spring 253 is locked. Also, the second swing member 2522 includes a second shaft portion 2522A projecting downward in the Z direction. When the swing member 2521 and the second swing member 2522 are assembled to each other, a vehicle body side tube settling port 2523 is formed, opening orthogonally to the Z direction and to which one end of the corrugated tube 112 is fixed. In the vehicle body side swing member 252, an insertion path 2524 for the electric wire bundle 111 is formed, passing through the vehicle body side swing member 252 from the vehicle body side tube settling port 2523 orthogonally to the vehicle body side swing shaft 255. The output wire bundle 111 which exited from one end portion of the corrugated tube 112 goes to the inside of the vehicle through this insertion path 2524.

The vehicle body side support member 251 includes a first support member 2511 and a second support member 2512. The first support member 2511 has the first shaft portion 2521A inserted thereinto and is provided with a first bearing portion 2511A that pivotally supports the first bearing portion 2521A. A spring accommodating portion 2511B for accommodating the vehicle body side coil spring 253 is formed so as to surround the first bearing portion 2511A. The spring accommodating portion 2511B has an opening 2511B-1 which opens downward in the vehicle. This opening 2511B-1 is closed by the upper surface of the first swing member 2521. Inside the spring accommodating portion 2511B, a second locking portion 2511C to which another end portion 2532 of the vehicle body side coil spring 253 is locked is provided. Further, the first support member 2511 is provided with a plurality of engaging holes 2511D for installing the two supporting members 2512.

The second support member 2512 of the vehicle body side support member 251 has the second shaft portion 2522A inserted thereinto, and is provided with a second bearing portion 2512A that pivotally supports the second shaft portion 2522A. In addition, the second support member 2512 is provided with a plurality of engaging protrusions 2512B that enters into and engages with a plurality of engagement holes 2511D in the first support member 2511.

The first shaft portion 2521A is pivotally supported by the first bearing portion 2511A, the first support member 2511 and the second support member 2512 are assembled to each other with the second bearing portion 2522A being pivotally supported by the second bearing portion 2512A. Then, the second support member 2512 is fixed to the vehicle body 60 by a not-shown fixing structure. At this time, a part of an outer face of the first support member 2511 and the second support member 2512 is configured integrally with the scuff trim 62 so as to be flush with the scuff trim 62.

Here, in the present embodiment as described above, the door side coil spring 243 in the door side holding part 240 biases the door side swing member 242 in the biasing direction D12 opposite to the opening direction D 111 of the slide door 50. Further, in the vehicle body side holding part 250, the vehicle body side coil spring 253 biases the vehicle body side swing member 252 in the same swinging direction D23 as the opening direction D 111 of the slide door 50. Such biasing of the door side swing member 242 and the vehicle body side swing member 252 which hold end portion of the corrugated tube 112 through which the wire harness 110 passes causes the wire harness 110 to move while deforming as follows when the riding door 50 opens and closes.

Figure 9:
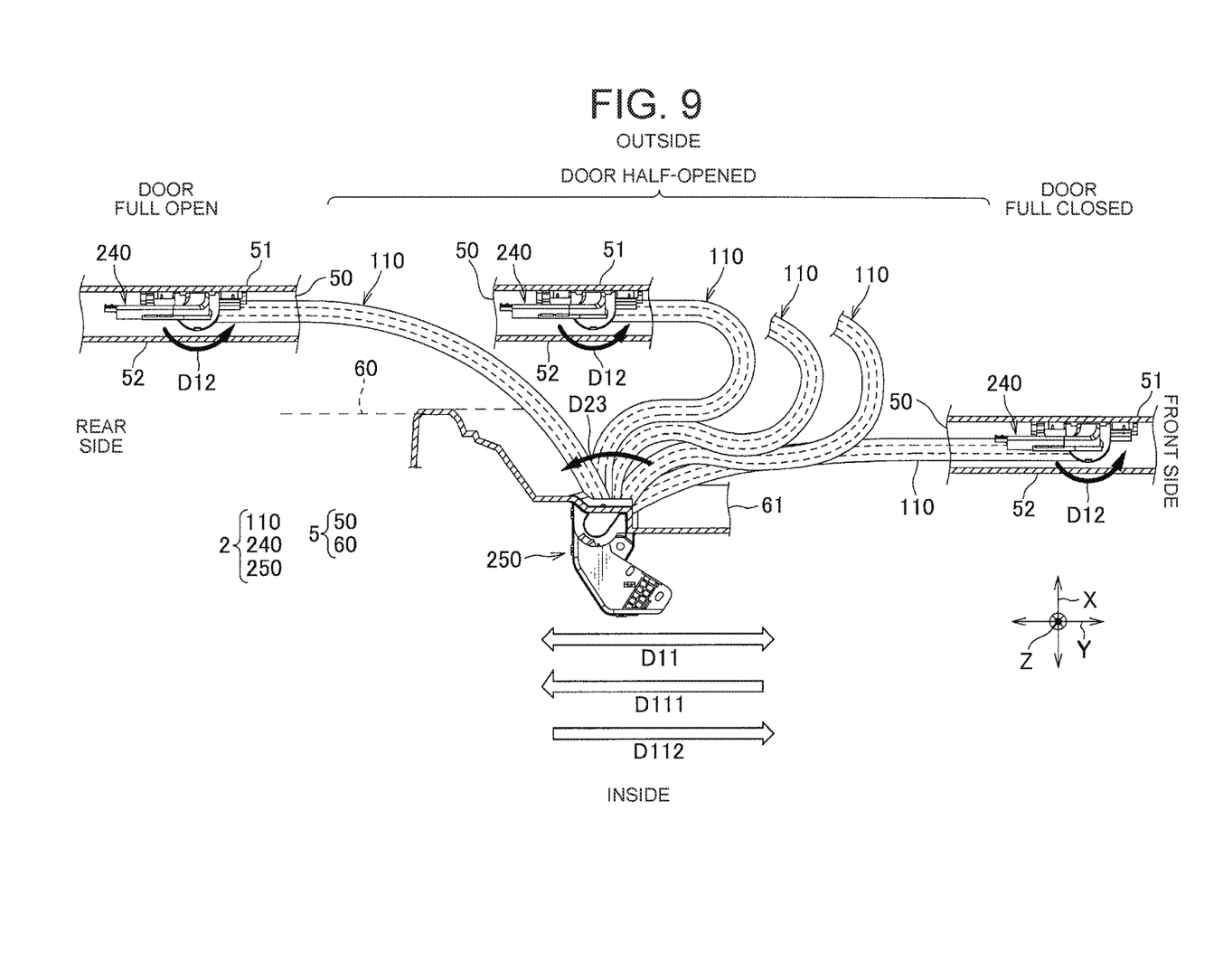
FIG. 9 is a diagram schematically illustrating deformation of a wire harness when the slide door opens and closes in the power supply device shown in FIG. 6.

FIG. 9 is a diagram schematically illustrating the relationship between the wire harness at the time of opening and closing the slide door in the power supply device shown in FIG. 6. Also in FIG. 9 the X direction, the Y direction, and the Z direction in FIG. 6 are shown. In addition, in FIG. 9, the right side in the figure corresponds to the front side of the vehicle 5, and the left side in the figure the rear side of the vehicle 5. Further, the upper side in the figure corresponds to the outside of the vehicle 5, and the lower side the inside of the vehicle 5.

In the power supply device 2 of the present embodiment, when the slide door 50 is fully closed, as is shown in FIG. 9 the door side holding part 240 is positioned on the front side of the vehicle 5 with respect to the vehicle body side holding part 250. At this time, the wire harness 110, against the biasing in the direction D12 from the door side coil spring 243, lies in a posture extending from the door side holding part 240 to the vehicle body side holding part 250.

When the slide door 50 opens, at the initial stage, the door side swing member 242 are first reversed by the biasing force in the biasing direction D12 from the door side coil spring 243. This inversion makes the wire harness 110 extend convexly in the closing direction D 112 of the slide door 50 and lies in a posture curved in a U shape on the way and heading toward the vehicle body side holding part 250. And, when the slide door 50 is half-opened, the wire harness 110, in such a posture, with the arm in the U shape on the door side pressed against the slide door 50, is drawn by the slide door 50 and moves. As a result, when the slide door 50 opens, the projecting of the wire harness 110 to the vehicle body 60 side, specifically the scuff trim 62, is suppressed.

Further, when the slide door 50 is closed, the wire harness 110 is pressed by the slide door 50 in the closing direction D112 with one end portion of the slide door 50 side in the corrugated tube 112 being pressed against the slide door 50 by the biasing force of the door side coil spring 243 in the biasing direction D12, and starts moving. Then, when the slide door 50 is half-opened, the wire harness 110 extends from one end portion on the slide door 50 side to the front side of the slide door 50 in the closing direction D112, and in the middle, in a posture curving in the U shape and heading toward the vehicle body side holding section 250 with the arm on the door side in the U shape being pressed against the slide door 50, is pressed by the slide door 50 to move. As a result, even when the slide door 50 closes, the side of the wire harness 110 on the vehicle body 60 side, that is, the protrusion to the scuff trim 62, is suppressed. In this way, the power supply device 2 of the present invention the biasing of the door side coil spring 243 can suppress the protrusion of the wire harness 50 toward the scuff trim 62 in the vehicle body 60 when the slide door 50 opens and closes.

Further, according to the power supply device 2 of the present embodiment, the part of the wire harness 110 on the slide door 50A side biased toward the slide door 50 in a posture extending from one end portion on the slide door 50 side as aforementioned when the slide door 50 opens and closes, is pushed in the opening direction D 111 of the slide door 50 by the bias in the swinging direction D 23 from the vehicle body side coil spring 253 against the vehicle body side swing member 252 in the vehicle body side holding part 250. Thereby, when the slide door 50 opens and closes, one end portion of the wire harness 110 on the vehicle body 60 side is raised toward the slide door 50. That is, the shape of the wire harness 110 at the time of half-opened of the slide door 50, as shown in FIG. 9, becomes such as shown in FIG. 9 after rising slightly toward the slide door 50 from the vehicle body side holding part 250 and then becomes curved in a U shape. As a result, the wire harness 110 is moved toward the slide door 50 as a whole. That is, according to the power supply device 2 of the present embodiment, the biasing of the vehicle body coil spring 253 can further suppress the protrusion of the wire harness 110 toward the vehicle body 60 when the door 50 opens and closes.

It is to be noted that the above-described embodiment merely shows a representative form of the present invention, and the present invention is not limited to the embodiments. That is, various modifications are made within the scope without deviating from the gist of the present invention. As long as the configuration of the power supply device of the present invention is provided even by such deformation, the modifications are of course included in the scope of the present invention.

For example, in the above-described first and second embodiments, the door side coil springs 144 and 243 are illustrated as an example of the biasing unit according to the present invention. However, the biasing part according to the present invention is not limited thereto, but may be a leaf spring or the like for example, not requiring a specific biasing method.

Further, in the first and second embodiments, the wire harness 110 in which the corrugated tube 112 is passed through the wire bundle 111 is exemplified as an example of a wire harness according to the present invention. However, the wire harness referred to in the present invention is not limited thereto, but the one in which the wire tube is not passed through, and the wire bundle is wound with tape windings, or is bound with binding bands or the like.

DESCRIPTION OF SYMBOLS 1, 2 power supply device
5 vehicle
50 Slide door
60 vehicle body
110 wire harness
110a vehicle body side linear portion
110b midsection
111 wire bundle
112 corrugated tube
140, 140', 240 door side holding part 141, 245 door side swing shaft
142, 152 fixed part
143, 153 swing part
144, 243 door side coil spring (an example of biasing part)
145 regulation part
150, 250 vehicle body side holding part
151, 255 vehicle body side swing shaft
154, 253 vehicle body side coil spring
D11 opening and closing direction
D111 open direction
D112 closing direction

What is claimed is:

1. A power supply device electrically connecting a vehicle body and a slide door in a vehicle having the vehicle body and the slide door, the power supply device comprising:
   a wire harness wired between the vehicle body and the slide door, a portion of the wire harness on the vehicle body side extending in a closing direction of the slide door when the slide door is half-opened;
   a swing part swingably supported about an axis parallel to the slide door and orthogonal to an opening and closing direction of the slide door for fixing an end portion of the wire harness located at the slide door side; and
   a biasing part for urging the swing part in a direction of the slide door at a side in the closing direction of the slide door in order to suppress the portion of the wire harness on the vehicle body side being curved convexly inside the vehicle body when the slide door is half-opened.

2. The power supply device according to claim 1, wherein when the slide door is half-opened, a middle portion of the wiring harness is pushed and curved convexly by biasing of the biasing part in the closing direction of the slide door on a plane intersecting the slide door and along an opening and closing direction of the slide door, and a portion extending from the vehicle body side to a curved portion extends in the closing direction to form substantially a U shape.

3. The power supply device according to claim 2, further comprising:
   a door side holding part fixed to the slide door, and holding swingably a portion of the wire harness on the slide door side about a door side swing shaft parallel to the slide door and orthogonal to the opening and closing direction; and
   a restricting part regulating a position of the wire harness about the door side swing shaft in an opening direction of the slide door so that the wire harness and the slide door form an acute angle of a predetermined angle or more about the door side swing shaft when the slide door is fully closed.

4. The power supply device according to claim 1, further comprising:
   a door side holding part fixed to the slide door, and holding swingably a portion of the wire harness on the slide door side about a door side swing shaft parallel to the slide door and orthogonal to the opening and closing direction; and
   a restricting part regulating a position of the wire harness about the door side swing shaft in an opening direction of the slide door so that the wire harness and the slide door form an acute angle of a predetermined angle or more about the door side swing shaft when the slide door is fully closed.

5. The power supply device according to claim 1, wherein the biasing part comprises a coil spring.

6. The power supply device according to claim 5, further comprising:
   a door side support member installed in the slide door, wherein the door side support member comprises:
      the coil spring,
      a support member into which the coil spring is housed,
      a guide member attached to the support member in a first direction and projecting from the support member and connected to the support member with the wire harness routed through an interior of the guide member and through the support member and coil spring therein,
   wherein the guide member is configured to rotate through a plane perpendicular to the first direction by an opening and a closing of the slide door and by a biasing force from the coil spring.

7. The power supply device according to claim 6, further comprising:
   a vehicle side support member installed in the vehicle body side,
   wherein the vehicle side support member comprises:
      a vehicle side coil spring,
      a vehicle side support member into which the vehicle side coil spring is housed,
      a vehicle side guide member attached to the vehicle side support member in the first direction and projecting from the vehicle side support member and connected to the vehicle side support member with the wire harness routed through an interior of the vehicle side guide member and through the vehicle side support member and vehicle side coil spring therein,
   wherein the vehicle side guide member is configured to rotate through the plane perpendicular to the first direction by the opening and the closing of the slide door and by a biasing force from the vehicle side coil spring.

8. The power supply device according to claim 7, wherein in a case in which the slide door is closed to the vehicle body:
      the vehicle side coil spring biases the wire harness in a first rotational direction such that the portion of the wire harness on the vehicle body is pressed toward the vehicle body by the vehicle side coil spring, and
      the coil spring biases the wire harness in a second rotational direction, opposite to the first rotation direction, such that the portion of the wire harness on the slide door is pressed to the slide door by the coil spring,
   wherein in a case in which the slide door is half-opened to the vehicle body:
      the vehicle side coil spring biases the wire harness in the first rotational direction, and
      the coil spring biases the wire harness in the second rotational direction, and
   wherein in a case in which the slide door is opened to the vehicle body:
      the vehicle side coil spring biases the wire harness in the second rotational direction, and
      the coil spring biases the wire harness in the second rotational direction.

* * * * *